US005523373A

United States Patent [19]
Esselborn et al.

[11] Patent Number: 5,523,373
[45] Date of Patent: Jun. 4, 1996

[54] POLYMETHACRYLATE ESTER/POLYSILOXANE BLOCK CO-POLYMERS METHOD FOR THEIRSYNTHESIS AND THEIR USE AS MODIFIERS AND AS LACQUER AND VARNISH ADDITIVES

[75] Inventors: Eberhard Esselborn, Essen; Jürgen Fock, Düsseldorf, both of Germany

[73] Assignee: Th. Goldschmidt AG, Essen, Germany

[21] Appl. No.: 424,745

[22] Filed: Apr. 18, 1995

[30] Foreign Application Priority Data

Apr. 26, 1994 [DE] Germany .......................... 44 14 465.2

[51] Int. Cl.$^6$ ..................................................... C08G 77/04
[52] U.S. Cl. .................. 528/26; 528/17; 528/18; 525/100
[58] Field of Search ................... 528/26, 17, 18; 525/100

[56] References Cited

U.S. PATENT DOCUMENTS

| | | |
|---|---|---|
| 3,663,650 | 5/1972 | Juliano . |
| 4,804,737 | 2/1989 | Berger et al. .............. 528/26 |
| 4,908,274 | 3/1990 | Jachmann et al. .......... 528/26 |

FOREIGN PATENT DOCUMENTS

| | | |
|---|---|---|
| 2164469 | 7/1972 | Germany . |
| 3842201 | 5/1990 | Germany . |
| 3842202 | 5/1990 | Germany . |
| 3906702 | 9/1990 | Germany . |
| 4006093 | 8/1991 | Germany . |
| 4123478 | 1/1993 | Germany . |
| 4202187 | 7/1993 | Germany . |

OTHER PUBLICATIONS

Synthesis of ABA Block Co–Oligomers of Polymethylmethacrylate and Poly(Dimethylsiloxane) by Yves Pietrasanta, Etienne Fleury, Bernard Boutevin & Lena Sarraf; pp. 107–112 (1986).
Polymer Preprints published by The Division of Polymer Chemistry, Inc. vol. 29, No. 1, Jun. 1988, pp. 148 & 149.
Polymer Preprints published by The Division of Polymer Chemistry, Inc. vol. 30, No. 1, Apr. 1989, pp. 259 & 260.
Polymer Preprints published by The Division of polymer Chemistry, Inc. vol. 31, No. 1, Apr. 1990, pp. 510 & 511.

Primary Examiner—Melvyn I. Marquis
Attorney, Agent, or Firm—Anderson Kill Olick & Oshinsky

[57] ABSTRACT

The invention relates to polymethacrylate ester/polysiloxane block copolymer of the ABA or AB type, A being a polymethacrylate ester block and B a polysiloxane block. The invention furthermore relates to a method for the synthesis of such block copolymers as well as to a method to modify synthetic resins, particularly those based on (meth)acrylates, by adding an effective amount of the inventive block copolymer. The invention also relates to the block copolymer as additives for organic lacquer and varnish systems.

4 Claims, No Drawings

POLYMETHACRYLATE ESTER/POLYSILOXANE BLOCK CO-POLYMERS METHOD FOR THEIRSYNTHESIS AND THEIR USE AS MODIFIERS AND AS LACQUER AND VARNISH ADDITIVES

FIELD OF THE INVENTION

The invention relates to polymethacrylate ester/polysiloxane block copolymers of the ABA or AB type, A being a polymethacrylate ester block and B a polysiloxane block. The invention furthermore relates to a method for the synthesis of such block copolymers as well as to a method to modify synthetic resins, particularly those based on (meth)acrylates, by adding an effective amount of the inventive block copolymer. The invention also relates to the block copolymer as additives for organic lacquer and varnish systems.

BACKGROUND INFORMATION AND PRIOR ART

Polymethacrylate ester/polysiloxane block copolymers are known. Their synthesis, however, creates considerable problems. The state of the art is given in the following publications:

In the German patent 21 64 469 and the U.S. Pat. No. 3,663,650, the reaction of cyclopolysiloxanes, such as hexamethyltrisiloxane, with methacrylate in the presence of an aromatic lithium carbanion initiator, such as dilithium benzophenone, for the purpose of synthesizing such compounds, is disclosed.

According to the Polym. Bull. (Berlin), 15 (2), 107–122, ABA block copolymers are synthesized by the reaction of poly(methyl methacrylate), controlled with mercaptopropylalkyl-alkoxysilanes, with hydroxy-functional polysiloxanes.

In Polym. Prepr. (Am. Chem. Soc. Div. Polym. Chem.), 29 (1), 148–149, a method is described for the synthesis of AB block copolymers on the basis of polydimethylsiloxane and poly(methyl methacrylate) by anionic polymerization and group-transfer polymerization.

Mason, J. P. et al. (Polym. Prepr., Am. Chem. Soc. Div. Polym. Chem. 30 (1), 259) describe the addition reaction between hexamethylcyclotrisiloxane and anionic "living" poly(methyl methacrylate), an AB block copolymer being obtained.

In the journal named, the same authors describe the synthesis of poly(methyl methacrylate)-polydimethylsiloxane block copolymers with a star structure or of the ABA type by the addition reaction of hexamethylcyclotrisiloxane and monohydroxy-terminated poly(methyl methacrylate) and subsequent termination with alkyl chlorosilane.

It is a disadvantage of the syntheses described that either they are carried out by anionic methods, which require the use of monomers of high purity and demand the implementation of the reaction at temperatures below 0° C. or the linking of the segments takes place over Si—O—C bonds, which are susceptible to hydrolysis. Because of the high sensitivity of the alkoxysilyl group of the chain transfer reagent used, the synthesis method, named in second place, also has disadvantages, since moisture must be excluded carefully during the reaction.

Recently, functionalized polyacrylate esters, which can be obtained by the transesterification reaction between alkyl polyacrylate esters (alkyl groups with 1 to 8 carbon atoms) and special alcohols, which generally have functional groups, have frequently been described, for example, in the German patents 38 42 201 and 38 42 202, as well as in the German Offenlegungsschriften 39 06 702, 40 06 093, 41 23 478, 42 02 187 and 42 24 412.

Compared to the analogous copolymerization products, the transesterification products have significant advantages such as an essentially more uniform molecular weight distribution. They are largely free of monomers. It is only by a transesterification method that it is possible to synthesize polyacrylate esters, the alcoholic ester component of which has olefinic double bonds, without forming higher molecular weight by-products. For example, it is readily possible to transesterify polyacrylate esters with oleyl alcohol and, at the same time, with other compounds having hydroxyl groups.

For these transesterification methods, the transesterification generally proceeds to the extent of about 70%, products being obtained with an, at least, approximate random distribution of the alcohols, introduced by the transesterification along the polymer chain.

These transesterification methods cannot readily be carried out with the corresponding alkyl polymethacrylate esters.

Admittedly, it is known from Chemical Abstracts 98 (No. 8, 54652f) that polymethacrylate esters can be reacted with a large excess of diethylaminoethanol at temperatures in excess of 150° C. in the presence of titanates as catalysts. By means of this reaction, polymers are obtained, in which a portion of the ester groups has been transesterified with diethylaminoethanol. At this temperature, however, relatively non-uniform products are obtained and thermal decomposition products cannot be avoided.

It was therefore surprising that it is possible, in a relatively simple manner and without forming unwanted by-products, to synthesize polymethacrylate ester/polysiloxane block copolymers by the transesterification of polymethacrylate esters with hydroxy-functional polysiloxanes and, with that, to obtain novel copolymers, which can be expected to have special properties and thus are of special interest from an application point of view.

OBJECT OF THE INVENTION

An object of the present invention are the inventive polymethacrylate ester/polysiloxane block copolymers. Another object of the invention is a method of synthesizing the inventive block copolymers. Yet another object of the invention is a method to modify synthetic resins by adding an effective amount of the inventive block copolymers. Another object of the invention is an additive for organic lacquer and varnishes comprising an effective amount of the inventive block copolymers.

DISCRIPTION OF THE INVENTION

The block copolymers have the general formula

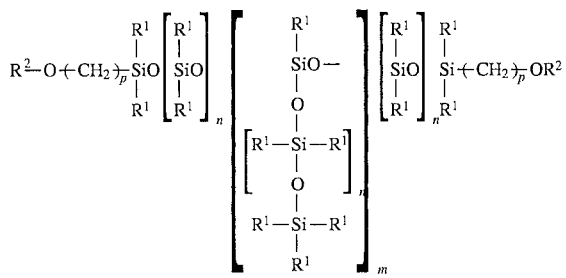

wherein

R$^1$ in a molecule are identical or different and represent alkyl groups with 1 to 18 carbon atoms or phenyl groups, with the proviso that at least 90% of the R$^1$ groups are methyl groups, R$^2$ are hydrogen or polymethacrylate ester groups of the general formula

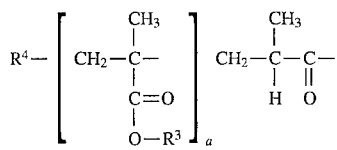

in which

R$^3$ are the same or different and represent alkyl groups with 1 to 8 carbon atoms, perfluoroalkyl groups or alkylamino groups, the nitrogen atom(s) of which can be protonated or quaternized, R$^4$ is the group of a known chain regulator without active hydrogen atoms, a is a number, which averages at least 3, with the proviso that at least one R$^2$ represents a polymethacrylate ester group, n in each case has a numerical value of 1 to 500, m has a numerical value of 0 to 10 and p has a numerical value of 3 to 12.

The R$^1$ groups preferably are lower alkyl groups with 1 to 4 carbon atoms and, in particular, methyl and aryl groups. Particularly preferred are polysiloxane blocks, in which all R$^1$ groups are methyl groups. For reasons of better compatibility with certain synthetic resins, it may, however, also be of advantage to exchange some of the methyl groups for phenyl groups. However, the condition that at least 90% of the R$^1$ groups are methyl groups must be fulfilled.

If the copolymer is of the AB type, R$^2$ represents a hydrogen group. If the copolymer has an ABA configuration, both R$^2$ groups must be polymethacrylate ester groups of the general formula

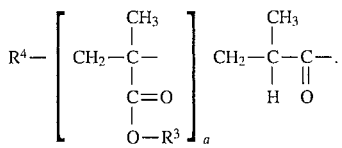

The R$^3$ groups of the above polymer molecule are identical or different and represent alkyl groups with 1 to 8 carbon atoms, perfluoroalkyl groups or alkylamino groups. Examples of suitable groups are the methyl, butyl and octyl groups. Examples of suitable perfluoroalkyl groups are the trifluoroethyl, pentafluoroethyl, nonafluorohexyl and tridecafluorooctyl groups. Particularly suitable as alkylamino groups are —(CH$_2$)$_q$—NR$^5$ groups, in which R$^5$ is an alkyl group with 1 to 18 carbon atoms or an aralkyl group, such as a benzyl group and q has a numerical value of 2 to 10; optionally, these can be protonized or quaternized.

R$^4$ is the group of a known chain regulator, the group being free of active hydrogen atoms. Examples of suitable chain regulators are mercaptans, chloroform and isopropyl alcohol. A preferred example of such an R$^4$ group, which originates from the chain regulator, is the —S—C$_{12}$H$_{25}$ group. Further examples of groups, which originate from the chain regulator, are the group derived from t-dodecyl mercaptan and the n-dodecyl mercaptan and the tetradecyl mercaptan groups.

a is a number which, on the average, is not less than 3 and preferably has a value of 6 to 50.

n indicates the number of difunctional siloxy groups and in each case has a value of 1 to 100.

m gives the number of branched, trifunctional silicon units and has a value of 0 to 10. Preferably, however, m=0, so that the polysiloxane has a linear structure.

p has a numerical value of 3 to 12 and preferably is 3 or 6.

Linear polymethacrylate ester/polysiloxane block copolymers and particularly those of the ABA type are preferred. Particularly preferred are copolymers, in which the R$^1$ groups are methyl groups, the R$^3$ groups are alkyl groups with 1 to 8 carbon atoms, subscript n in each case is 4 to 50, subscript m is 0 and subscript p is 3 or 6.

Examples of suitable, inventive substances are:

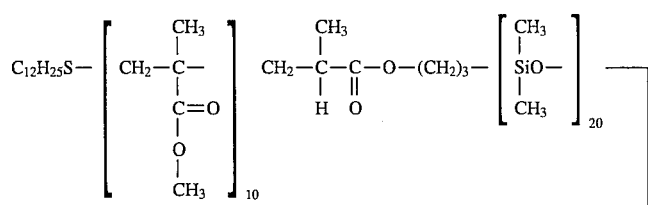
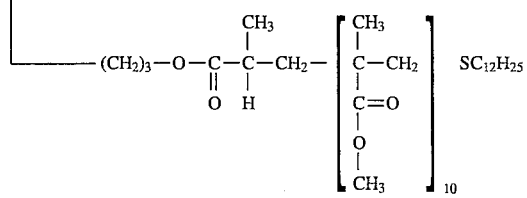
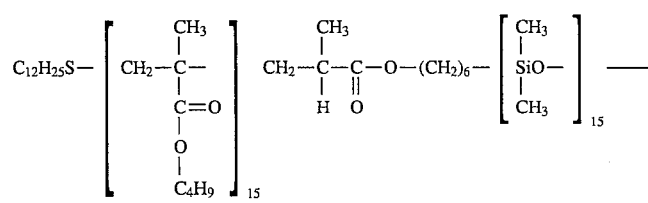
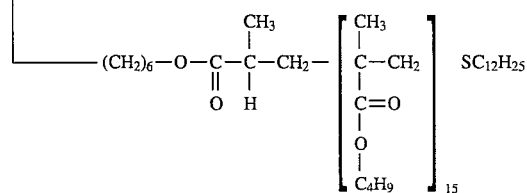
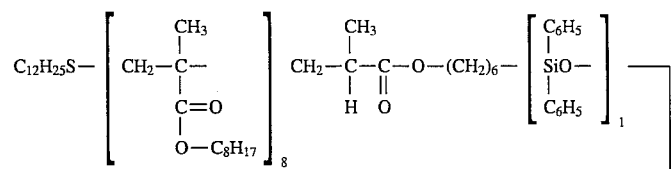
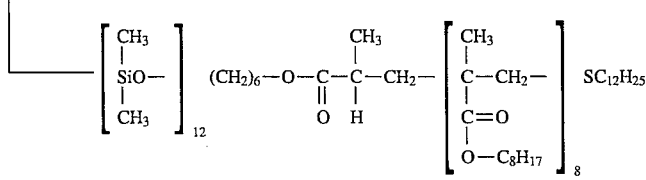

-continued

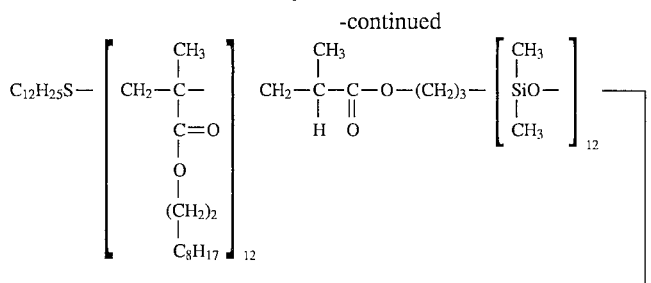

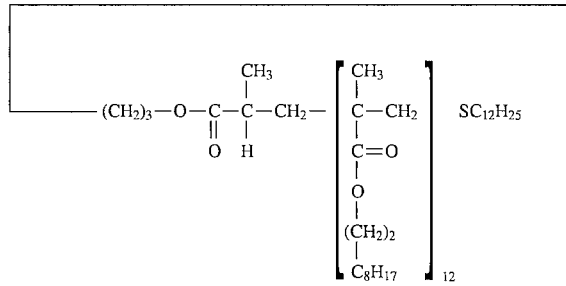

A further object of the present invention comprises the synthesis of the inventive compounds. For this synthesis, the inventive method is characterized in that polysiloxanes of the general formula

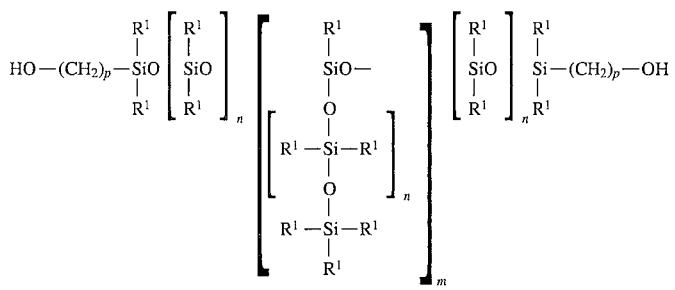

wherein the $R^1$ groups and the subscripts n, m and p have the meanings already given, are reacted with polymethacrylate esters of the general formula

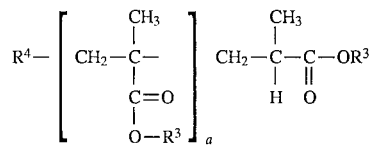

in the molar ratio of polymethacrylate esters to polysiloxanes of 1:1 to 2.5 to 1 in the presence of transesterification catalysts and optionally in the presence of inert solvents at temperatures of 70° to 150° C., the $R^3OH$ alcohol set free being distilled off.

It was surprising that, under these conditions, the reaction took place at only one or, to a very slight extent, at both terminal methacrylate ester groups. The methacrylate esters in the chain are not transesterified or are transesterified to a negligible extent. It is, however, a prerequisite for this that no basic transesterification catalysts, such as alkali methylate, and no reaction temperatures in excess of 150° C. are used.

Preferred transesterification catalysts are alkyl titanate, alkyl zirconate, dialkyl tin acetate halide or dialkyl tin dialkyl ester, which are used in amounts of 0.5 to 2% by weight, based on the polymethacrylate ester. Examples of particularly suitable catalysts are isopropyl titanate, n-butyl titanate, n-propyl zirconate, dibutyl tin acetate chloride, dibutyl tin diacetate and dibutyl tin dilaurate.

The reaction temperature is 70° to 150° C. and preferably 100° to 130° C.

The reaction can be carried out with or without a solvent. In the event that a solvent is used, toluene, xylene or gasoline fractions with a boiling point range of 70° to 140° C. are available.

Yet another object of the invention is the use of the inventive compounds. On the basis of the special structure of the inventive copolymers, the latter are suitable particularly for modifying polymers, such as polymethyl (meth)acrylate, polybutyl(meth)acrylate and (meth)acrylate copolymers.

The inventive compounds can furthermore be added to organic lacquers and varnishes. The surface films, obtained after drying and/or curing, are very smooth, have a very low slippage resistance and a high scratch resistance. Moreover, the modified lacquers and varnishes impart improved water repulsion and thus contribute to a lasting improvement in the resistance to hydrolysis and weathering. At the same time, they exhibit good substrate adhesion and high permanence during cleaning processes.

Furthermore, they can lower the melt viscosity of various thermoplasts.

When used in combination with silicone oils, they increase the impact resistance of different thermoplasts, such as HIPS and ABS.

In the following examples, the synthesis of the inventive compounds is explained in greater detail, it is being understood that the examples are given by way of illustration and not by way of limitation. The application properties of the inventive compounds arise out of the appropriate, subsequent examples.

EXAMPLE 1

Synthesis of a Polymethacrylate by Controlled, Free-Radical Polymerization (a starting product, not of the invention)

A solution of 1.4 g of azodiisobutyronitrile, 94 g (approximately 0.47 moles) of dodecyl mercaptan, 76 g of xylene and 376 g (approximately 3.76 moles) of methyl methacrylate is added over a period of 3 to 4 hours to a reactor filled with 40 g of xylene. The solvent in the reactor is at a temperature of 100° C. under a protective atmosphere of pure nitrogen. Subsequently, a further 0.93 g of azodiisobutyronitrile, dissolved in 9.3 g of methyl ethyl ketone, are added in equal portions over a period of 1 hour. The reaction mixture is subsequently heated for a further hour at the constant temperature of 100° C. At the end of the reaction, the solvent and the residual monomer are distilled off at 130° C. and 1 torr leaving behind a colorless, viscous liquid.

Gel chromatographic analysis reveals that the polymer obtained has a number average molecular weight $M_n$ (GPC) of 1100 and a weight average molecular weight $M_w$ (GPC) of 1710. The nonuniformity coefficient therefore is 1.55. The residual monomer content is less than 0.1%. The examples is repeated with different methacrylates, as shown in the following Table:

TABLE 1

| Example No. | Methacrylate | Molar Ratio of Methacrylate/Controller | $M_n$/Osmometry | $M_n$/GPC PMMA Standard | Nonuniformity Coefficient |
|---|---|---|---|---|---|
| 1 A | MMA | 8/1 | 1150 | 1100 | 1.55 |
| 1 B | MMA | 28/1 | 2600 | 2650 | 1.86 |
| 1 C | BMA | 5.6/1 | 950 | 1000 | 1.39 |
| 1 D | EHMA | 4/1 | 950 | 1350 | 1.34 |
| 1 E | TFEMA | 7/1 | 1050 | 1150 | 1.49 |

MMA: Methyl methacrylate
BMA: n-Butyl methacrylate
EHMA: 2-Ethylhexyl methacrylate
TFEMA: 2,2,2-Trifluoroethyl methacrylate

EXAMPLE 2

Synthesis of a Polymethyl methacrylate/Polysiloxane/Polymethacrylate Copolymer (of the invention)

Product 1 A (121 g, approximately 0.11 moles) and 119 g (approximately 0.05 moles) of an α, ω-dihydroxyhexylpolysiloxane with a molecular weight of 2380 are dissolved in 100 g of xylene and heated under pure nitrogen to about 110° C. The solvent is subsequently distilled off at 5 torr, any water present being distilled off at the same time. After the addition of 240 g of dry xylene, 0.6 g of isopropyl titanate is added at 115° C. The methanol, formed when the reaction sets in, is removed by fractionation from the xylene. After 4 hours, a further 0.6 g of isopropyl titanate are added and the methanol is removed. The reaction is terminated 3 hours later.

The hydroxyl number of the product obtained is 1.5. This corresponds to a conversion of 94%, based on the hydroxyl groups of component used in less than stoichiometric amount.

Further inventive block copolymers are synthesized in accordance with the information in the following Table:

TABLE 2

| Example No. | Polymethacrylate Product | Molar Ratio | $M_n$ Polysiloxane | Reaction Time (h) | Hydroxyl No. of End Product | Conversion (%) |
|---|---|---|---|---|---|---|
| 2 A | 1 A | 2.2 | 2380 | 7 | 1.5 | 94 |
| 2 B | 1 A | 2.1 | 80 | 5 | 1.0 | 97 |
| 2 C | 1 C | 2.2 | 3280 | 10 | 1.0 | 91 |
| 2 D | 1 D | 2.3 | 2380 | 12 | 1.3 | 94 |
| 2 E | 1 E | 2.2 | 2380 | 8 | 0.8 | 97 |
| 2 F | 1 B | 2.3 | 2380 | 8 | 1.6 | 90 |

We claim:

1. Polymethacrylate ester/polysiloxane block copolymers of the general formula

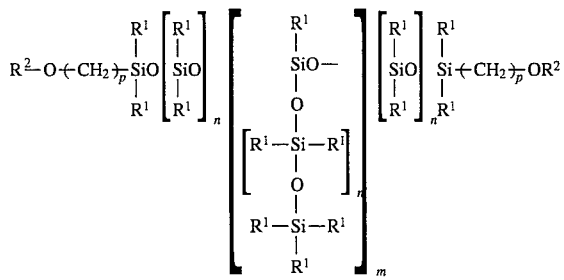

wherein $R^1$ in a molecule are identical or different and represent alkyl groups with 1 to 18 carbon atoms or phenyl groups, with the proviso that at least 90% of the $R^1$ groups are methyl groups, $R^2$ are hydrogen or polymethacrylate ester groups of the general formula

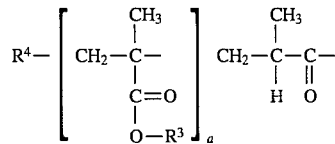

in which $R^3$ are same or different and represent alkyl groups with 1 to 8 carbon atoms, perfluoroalkyl groups or alkylamino groups, the nitrogen atom(s) of which are protonated or quaternized, $R^4$ is a chain regulator without active hydrogen atoms, a is a number, which averages at least 3, with the proviso that at least one $R^2$ represents a polymethacrylate ester group, in each case has a numerical value of 1 to 500, m has a numerical value of 0 to 10, and P1 has a numerical value of 3 to 12.

2. The block copolymer of claim 1, comprising that the $R^1$ groups are methyl groups and the $R^3$ groups are alkyl groups with 1 to 4 carbon atoms, the subscript n has a numerical value of 4 to 100, the subscript m has a numerical value of 0 and the subscript p has a numerical value of 3 or 6.

3. A method for the synthesis of block copolymers of the general formula

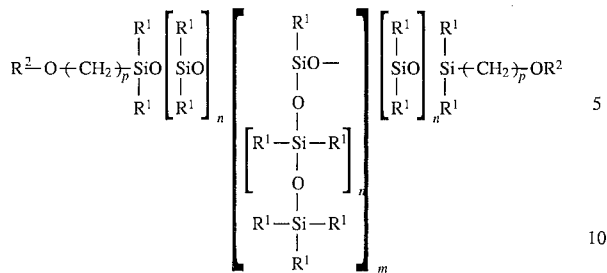

wherein
R¹ in a molecule are identical or different and represent alkyl groups with 1 to 18 carbon atoms or phenyl groups, with the proviso that at least 90% of the R¹ groups are methyl groups, R² are hydrogen or polymethacrylate ester groups of the general formula

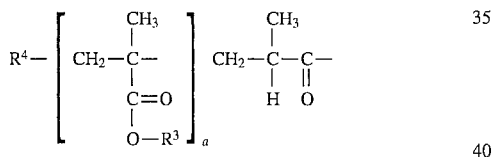

in which
R³ are same or different and represent alkyl groups with 1 to 8 carbon atoms, perfluoroalkyl groups or alkylamino groups, the nitrogen atom(s) of which are protonated or quaternized, R⁴ is a chain regulator without active hydrogen atoms, a is a number, which averages at least 3, with the proviso that at least one R² represents a polymethacrylate ester group, n in each case has a numerical value of 1 to 500, m has a numerical value of 0 to 10, and p has a numerical value of 3 to 12, comprising the steps of reacting a polysiloxane of the general formula

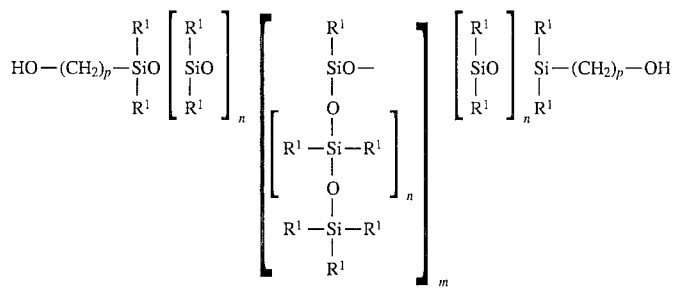

wherein R¹ groups and the n, m and p subscripts have the meaning already given, with polymethacrylate esters of the general formula

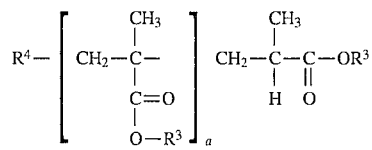

in a molar ratio of polymethacrylate esters to polysiloxanes of 1:1 to 2.5:1 in presence of a transesterification catalyst and optionally in distilling off presence of an inert solvent at a temperature of 70° to 150° C., and distilling off the R³OH alcohol being set free in the process.

4. The method of claim 3, wherein the R¹ groups are methyl groups and the R³ groups are alkyl groups with 1 to 4 carbon atoms, the subscript n has a numerical value of 4 to 100, the subscript m has a numerical value of 0 and the subscript p has a numerical value of 3 or 6.

* * * * *